May 23, 1933.  C. I. McNEIL  1,910,473
ELECTRICAL APPARATUS AND METHOD
Filed April 21, 1930
Fig. 1.
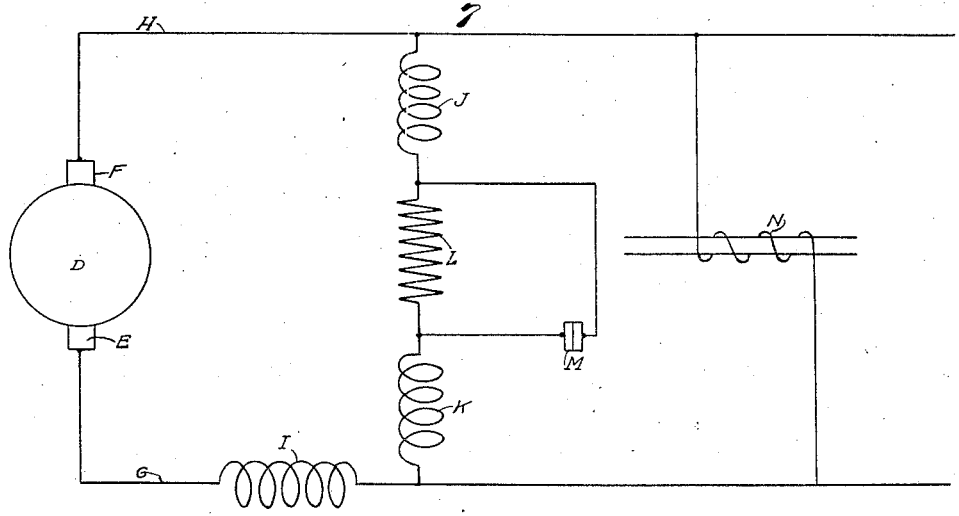
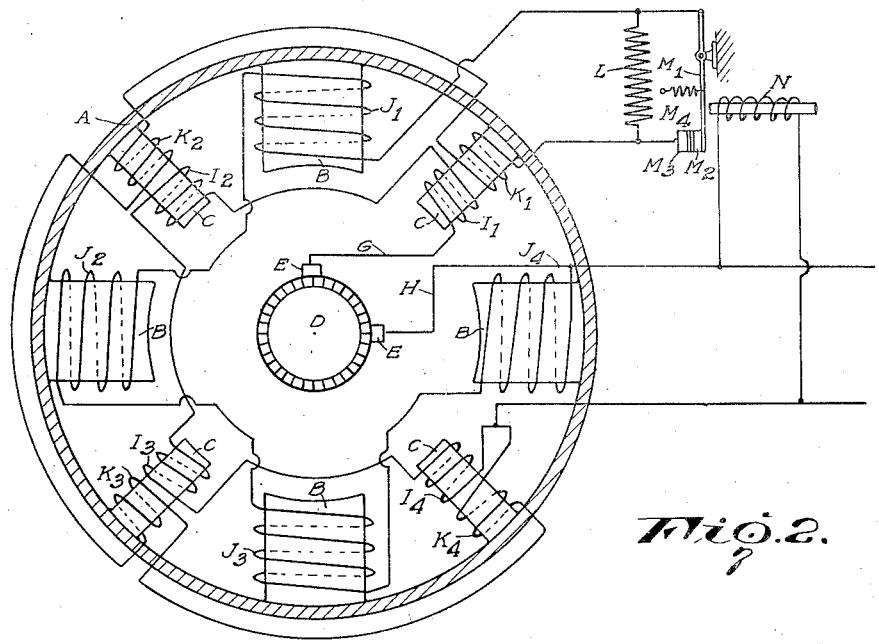
Fig. 2.
Inventor
Charles I. McNeil
By
F. B. Smith.
Attorney Patented May 23, 1933

1,910,473

UNITED STATES PATENT OFFICE

CHARLES I. McNEIL, OF BLOOMFIELD, NEW JERSEY, ASSIGNOR TO ECLIPSE AVIATION CORPORATION, OF EAST ORANGE, NEW JERSEY, A CORPORATION OF NEW JERSEY

ELECTRICAL APPARATUS AND METHOD

Application filed April 21, 1930. Serial No. 446,133.

This invention relates to dynamo electric machines and one of the objects thereof is to provide a novel method for improving commutation in a dynamo electric machine by preventing sparking at the brushes.

Another object of the invention is to provide a novel method for improving commutation in a variable speed direct current dynamo electric machine by preventing sparking at the brushes irrespective of the speed of the machine.

Another object is to provide in a dynamo electric machine a novel arrangement of the magnetizing windings on commutating poles so that the proper commutating pole strength may be had upon increases in speed of the machine.

Another object is to provide an apparatus which will vary the magnetizing effect of the commutating pole windings in accordance with variations in the main field strength resulting from variations in speed in a dynamo electric machine.

Although but one embodiment only of the present invention is illustrated in the accompanying drawing, it is to be expressly understood that the drawing is for purposes of illustration only and are not designed as a definition of the limits of the invention, reference being had for this purpose to the appended claims.

Fig. 1 is a diagrammatic view showing one of the commutating pole windings in series with the load and the other commutating pole winding in series with the shunt field.

Fig. 2 is a conventional representation of a four pole direct current machine, showing the relation of the magnetizing windings and embodying the features of the invention.

As is well known to those skilled in the art, upon increases in speed of direct current dynamo electric machines, the flux produced by the armature reaction tends to shift the neutral point of the main field from its proper mechanical position. As a result a difference in potential exists between the commutator segments short circuited by the brushes, causing a sparking, which deteriorates both the commutator and the brushes. If an auxiliary or commutating field flux is provided equal to and opposing that set up by the armature reaction it will nullify the distortive effect on the neutral point of the main field. This commutating field is created by coils wound on pole pieces placed between the main field poles of the machine and are commonly known as interpoles.

The method proposed in the present invention for increasing the interpole flux with increases in speed is to provide first two means of interpole excitation which oppose each other and which at the normal minimum operating speed of the machine produce a net effective flux sufficient to correct the effect of armature reaction at that speed. In the next step of the method, upon increase in speed, the voltage regulator decreases the strength of the main field thereby weakening the commutating field while the interpole magnetic excitation of one source is maintained constant. In the third step of the method the opposing interpole magnetic excitation of the other source is decreased inversely proportional to increases in the speed of the machine giving a resultant effective increased flux at increased speeds of the machine, to correct the effect of the weakened main field upon the commutating field.

The novel arrangement of magnetizing windings and apparatus for carrying out the process is disclosed in the drawing where A represents the frame of a four pole direct current shunt field dynamo electric machine. On the frame are mounted the four main field pole pieces B disposed at the proper angle on the interior of the frame. Midway between these main field poles are positioned the four commutating poles C commonly known and hereafter termed interpoles. Within the frame and between the poles an armature is adapted to rotate having a commutator D from which the current generated by the machine is collected by the brushes E, F.

The current collected from the commutator supplies a substantially constant load consuming device (not shown) by means of lead wires G and H. In series with one of the lead wires of the load circuit is an interpole winding I having coils $I_1$, $I_2$, $I_3$, $I_4$ of the required number of turns on each of the interpoles for creating a magneto-motive force which will nullify and correct the distortive effect of the magneto-motive force created by the armature reaction.

The main shunt field circuit has a field winding J connected across the leads G and H. This main field winding comprises coils $J_1$, $J_2$, $J_3$, $J_4$ of the required number of turns mounted on each of the main field poles. In series with this shunt field winding is a differential interpole winding K having coils $K_1$, $K_2$, $K_3$, $K_4$ of the required number of turns on each of the interpoles wound or connected in such a manner as to create a magneto motive force opposing the magneto motive force of the coils $I_1$, $I_1$, $I_3$, $I_4$, which latter are in series with the load. These second coils $K_1$, $K_2$, $K_3$, $K_4$ are so designed with respect to the coils $I_1$, $I_2$, $I_3$, $I_4$ that a net effective flux is produced by coils $I_1$, $I_2$, $I_3$, $I_4$ sufficient to correct the distortion of the neutral point of the main field caused by the armature reaction, when the machine is running at normal minimum operating speed.

A voltage regulator is provided to maintain the voltage output of the machine constant by varying the main shunt field strength. This regulator is composed of a resistance L in series with the main field coil and the differential interpole winding K but under normal operating speed is short circuited by a switch M. This switch is of the vibrating contact type having a pivoted arm $M_1$ of magnetic material connected at one end on one side of the resistance L and having a contact $M_2$ on the other end adapted to cooperate with a contact $M_3$ positioned on the other side of the resistance. A spring $M_4$ holds these contacts closed. A coil N is connected across the line that is responsive to voltage and constitutes an electro-magnet for attracting the arm against the action of the spring.

When the machine is operating at a normal speed the magneto motive force of the differential interpole winding K opposes the magneto motive force of the main interpole winding I and the design of the coils of the two windings is such that an effective flux is produced by the main interpole winding to correct the distortive effect of armature reaction at that speed. Upon an increase in speed the voltage output tends to increase at which time the voltage coil N is sufficiently energized to open the short circuiting switch M and the resistance L is inserted in the shunt field circuit. The period of time during which the resistance L is in the shunt field circuit varies with the speed. At a speed greater than normal the switch contact $M_2$ will vibrate, and the greater the increase in speed the greater will be the number of vibrations over a given period of time with the result that the resistance L is in the circuit a longer time producing an effective decrease in the field current and a substantially constant voltage output is maintained.

With the load remaining substantially constant and the voltage output maintained constant the magneto-motive force produced by the main interpole winding I will remain constant at any speed. The effective current in the shunt field circuit is inversely proportional to the effective resistance in that circuit which, as explained, increases in direct proportion with increases in speed. The magneto-motive force produced by the differential interpole winding K is therefore inversely proportional to the speed. As the magneto-motive force in the main interpole winding I remains substantially constant and the magneto-motive force in the differential winding K decreases proportionally with increases in speed the net effect will be a resultant increase in the flux produced by the main interpole winding I directly proportional to the speed.

As is apparent, a simple and effective means has been provided for increasing the effective interpole flux upon increases in speed of the dynamo-electric machine which will correct the distortive effect produced on the main shunt field by the armature reaction and prevent sparking at the brushes.

It will be obvious that the invention is not limited to the specific form described and illustrated in the drawing, but is capable of a variety of electro-mechanical embodiments. Various changes, which will now appear to those skilled in the art, may be made in the form, details of construction and arrangement of parts without departing from the spirit of the invention, and reference is therefore to be had to the appended claims for a definition of the limits of the invention.

What is claimed is:

1. The method of varying the interpole flux with variations in speed of a dynamo-electric machine having a main interpole winding in series with a load, and a differential interpole winding in series with a shunt field, which consists in producing an opposing magneto-motive force in each winding to give a proper resultant effective flux at normal operating speed of the machine, and then varying the magneto-motive force produced by one winding in accordance with variations in the speed of the machine to give a resultant increased effective flux upon an increase in speed of the machine.

2. The method of varying the interpole flux with variations in speed of a dynamo-electric machine having a main interpole winding in series with a substantially constant load and a differential interpole winding in series with the shunt field of said machine, which consists in equalizing the magneto-motive force produced by each winding to give the proper effective flux at normal minimum operating speed of the machine and then varying the magneto-motive force produced by the differential winding in accordance with variations in the field current to give a resultant increased effective flux upon a decrease in field current.

3. The method of increasing the interpole flux with increases of speed of a dynamo-electric machine having a main interpole winding and a differential interpole winding on the same pole piece located between the winding of the shunt field of said machine, which consists in producing a magneto-motive force in each interpole winding to give the proper effective flux at normal minimum operating speed of the machine, of then controlling the voltage output of the machine, upon increases in speed, by decreasing the field current, and then decreasing the magneto-motive force in one interpole winding in accordance with the decrease in the field current to give a resultant increased interpole flux upon increases in speed.

4. The method of increasing the interpole flux with increases in speed of a dynamo-electric machine having a main interpole winding in series with a substantially constant load and a differential interpole winding in series with a shunt field, which consists in producing a magneto-motive force in each winding to give the proper effective flux at normal operating speed of the machine, of then maintaining the magneto-motive force of the main interpole winding constant upon increases in speed of the machine by decreasing the field current, and then decreasing the magneto-motive force in the differential winding by and in accordance with the decrease in the field current to give a resultant increased effective flux with an increase in speed of the machine.

5. In combination with a dynamo-electric machine, a load circuit, including a main interpole winding and a shunt field circuit including a differential interpole winding, and means for maintaining the voltage in the load circuit constant and decreasing the current in the field circuit with increases in speed of the machine, whereby a resultant increase in the interpole flux will be produced upon increases in speed of the machine.

6. In combination with a dynamo-electric machine, a load circuit including a main interpole winding, a shunt field circuit including a differential interpole winding and means comprising a resistance and a voltage responsive circuit breaker for maintaining the voltage output of the machine constant by varying the field current to produce a resultant effective increased interpole flux upon increase in speed.

7. In combination with a dynamo-electric machine, a constant load circuit including a main interpole winding for producing a magnetic field, a shunt field circuit including a differential interpole winding for producing an opposing magnetic field, and means responsive to variations in speed of the machine for maintaining the main interpole field constant and for varying the differential interpole field to give an effective resultant interpole field upon increases in speed.

8. In combination with a dynamo-electric machine having a shunt field circuit, a load circuit, means in the load circuit for producing an interpole magneto-motive force in proportion to the load, means in the shunt field circuit for producing an opposing variable interpole magneto-motive force, and means interposed in the shunt field circuit for decreasing the opposing interpole magneto-motive force upon an increase in speed of the machine so that a resultant effective interpole flux is produced with increases in speed.

9. In combination with a dynamo-electric machine, a load circuit including means for producing an interpole magneto-motive force, a shunt field circuit including means for producing an interpole magneto-motive force opposing the magneto-motive force produced by the first named means, and means responsive to increases in speed for decreasing the magneto-motive force produced by the second named means to effect a resultant increased interpole flux for increases in speed.

10. In combination with a dynamo-electric machine, a load circuit including means for producing an interpole magneto-motive force, a shunt field circuit including means for producing a variable interpole magneto-motive force opposing the magneto-motive force produced by the first named means, and means variable in proportion to variations in speed for maintaining the current of the load circuit substantially constant and varying the current in the shunt field circuit to effect a resultant interpole flux which increases in direct proportion to increases in speed.

11. In combination with a dynamo-electric machine, a constant load circuit, means in said load circuit for producing a main interpole magneto-motive force, a shunt field circuit, means in said shunt field circuit for producing a differential interpole magneto-motive force, means for maintaining the current in the load circuit substantially constant by varying the field current upon variations in speed of the machine so that an effective interpole flux is provided which varies directly with the speed.

12. In combination with a dynamo-electric machine, a load circuit including a main winding for producing an interpole flux, a shunt field circuit including a variable resistance and a differential winding, the latter being adapted to produce an interpole magneto-motive force opposing the magneto-motive force produced by the main winding, a vibrating switch responsive to variations in speed for increasing the resistance in the shunt field circuit upon increases in speed of the armature of said machine to maintain the magneto-motive force produced by the main winding constant and to decrease the magneto-motive force produced by the main winding constant and to decrease the magneto-motive force produced by the differential winding to effect a resultant increased interpole flux for increases in speed.

In testimony whereof I have signed this specification.

CHARLES I. McNEIL.